(12) United States Patent
Lee et al.

(10) Patent No.: US 8,745,249 B2
(45) Date of Patent: Jun. 3, 2014

(54) INTELLIGENCE VIRTUALIZATION SYSTEM AND METHOD TO SUPPORT SOCIAL MEDIA CLOUD SERVICE

(75) Inventors: Han-ku Lee, Seoul (KR); Hyo-Gun Yoon, Daejeon (KR); Yun Cui, Seoul (KR)

(73) Assignee: Konkuk University Industrial Cooperation Corp., Seoul (KR)

( * ) Notice: Subject to any disclaimer, the term of this patent is extended or adjusted under 35 U.S.C. 154(b) by 223 days.

(21) Appl. No.: 13/329,442

(22) Filed: Dec. 19, 2011

(65) Prior Publication Data

US 2012/0166517 A1 Jun. 28, 2012

(30) Foreign Application Priority Data

Dec. 28, 2010 (KR) ........................ 10-2010-0136592

(51) Int. Cl.
*G06F 15/16* (2006.01)
*G06F 7/00* (2006.01)
*G06Q 10/00* (2012.01)

(52) U.S. Cl.
USPC ........................... 709/228; 707/741; 705/7.11

(58) Field of Classification Search
USPC .................. 709/203, 228; 707/741; 717/148; 705/7.11
See application file for complete search history.

(56) References Cited

U.S. PATENT DOCUMENTS

| | | | |
|---|---|---|---|
| 8,037,506 B2* | 10/2011 | Cooper et al. ................... | 725/93 |
| 8,229,819 B2* | 7/2012 | Ransom et al. .................. | 705/35 |
| 2010/0095009 A1* | 4/2010 | Matuszewski et al. ........ | 709/228 |
| 2010/0228617 A1* | 9/2010 | Ransom et al. ............ | 705/14.25 |
| 2011/0022812 A1* | 1/2011 | van der Linden et al. ..... | 711/163 |
| 2011/0173035 A1* | 7/2011 | Isom ........................... | 705/7.11 |
| 2012/0030210 A1* | 2/2012 | Sankhla et al. ............... | 707/741 |
| 2012/0102050 A1* | 4/2012 | Button et al. ................. | 707/749 |

\* cited by examiner

*Primary Examiner* — Krista Zele
*Assistant Examiner* — Michael A Chambers
(74) *Attorney, Agent, or Firm* — Lexyoume IP Meister, PLLC (57) ABSTRACT

The present invention relates generally to intelligence virtualization system and method to support social media cloud service and more particularly to multi agent structure automatically performing intelligent virtualization method for service resource for a user's access and allocation of virtualized resources and more particularly to a intelligence virtualization system and method to support social media cloud service that automates learning process of multi agents for distribution of new social media service resources and service resource management of additional component of social media cloud computing.

8 Claims, 9 Drawing Sheets

INTELLIGENCE VIRTUALIZATION SYSTEM AND METHOD TO SUPPORT SOCIAL MEDIA CLOUD SERVICE

CROSS-REFERENCE TO RELATED APPLICATIONS

This U.S. non-provisional patent application claims priority under 35 U.S.C. §119 of Korean Patent Application No. 10-2010-0136592 filed on Dec. 28, 2010, the entire contents of which are hereby incorporated by reference.

TECHNICAL FIELD

The present invention relates generally to an intelligence virtualization system and a method to support social media cloud service and more particularly to a multi agent structure automatically performing an intelligent virtualization method of service resource for a user's access and performing an allocation of virtualized resource and more particularly to an intelligence virtualization system and a method to support social media cloud service that automates learning process of multi agents for the distribution of new social media service resources and management of service resources for additional components of social media cloud computing.

BACKGROUND

Social media is a service used to share opinions, ideas, experiences, perspectives of people connected personally in various forms of information such as text, image, audio, video and etc. The representative examples of social media are micro blogging, social network services, message boards, podcasts, wikis and Vlogs (video blogs). That is, it is a kind of service to construct diversity with human collective intelligence by joining the service and by sharing personally owned media information or contents via network. Therefore, it is making changes in organization structures like making strategies or decisions of an enterprise based on customers' needs by applying networking and customer understanding as key values of the enterprise.

The social media service differs in distributing service resources and in composition of services in accordance whether it is a mobile service using a smart phone or whether it is a service using a desktop computer. Thus how to distribute the service resources according to devices for using the services is very important. Especially, cloud computing is a user focused service environment directly providing service resources that a user needs since it is able to logically distribute social media service resources. Moreover, cloud computing is a collection of computing infrastructure that provides application service resources on various users' demands. Cloud computing comprises Saas (Software as a service) constructing a service, Paas (Platform a as a service) constructing a platform and Iaas (Infrastructure as a service) constructing infrastructure. Recently, cloud computing focuses on service developments such as storage computing, distribution of various resources and etc. But a system that automatically registers and manages various service resources is rare. That is, a method how to automatically distribute service resources by continuously monitoring social media service resources is being required. And a method that intelligently virtualizes the service resources requested by users according to devices is also being required. Moreover, a structure for a manager to manage a social media cloud system directly or indirectly for efficient managing of these resources is being required also.

In general, service resources are being distributed based on user's grades or limitations of service resources. This method results in increasing loads on servers or networks since it requires continuous monitoring by a manger.

Therefore, a necessity to design an intelligent virtualization method that intelligently distributes service resources to users on their demands and to develop a system and a method to automatically recommend social media service resources to users is increasing.

Thus it is an object of the present invention to design an intelligent virtualization method to distribute service resources in the social media cloud computing by using an intelligent automatic structure rather than by using direct services of a manager based on users' grades or limitations of service resources.

SUMMARY

An intelligence virtualization system to support social media cloud service comprises a user agent analyzing and learning a user's action according to a user's request of a service and access type, a distribution agent analyzing a service resource according to the user agent's request and distributing the service resource according to a user's request and access, an agent manager monitoring learning and action status of multi agents comprised in social cloud system via the distribution agent, a gathering agent collecting a service resource via the agent manager and a social media service system and managing separately according to the service resource, a virtualization register monitoring and managing a social media service resource virtualized via the distribution agent from generation to extinction thereof, a system resource manager providing a manager with monitored information of a user of a social media cloud system, a logical virtualization resource, an operation status of the virtualization system via the gathering agent, a virtualization module comprising resources including an infrastructure resource, a platform resource, a service resource and an application program of a cloud system for the distribution agent to have distributed according to a user's service status and a profile part being used as a learning material that is transmitted from the virtualization register and being time of usage, rate of usage and contents of a social media service resource that is constructed by the virtualization through the agent manager.

An intelligence virtualization method to support social media cloud service comprises analyzing and learning a user's action according to a user's request of a service and an access type at a user agent, deciding a resource of a cloud service system according to an analyzed user type according to a service and providing a virtualized module at a distribution agent, managing a definition of a virtualization module of a service resource distributed by the distribution agent and a system status at a virtualization register, managing multi agents constructed for virtualization of a social media service resource at an agent manager, monitoring and managing physical and logical resources of a social media cloud system at a system resource manager, handling user's request of a service, a virtualization of a service resource and a provision of service and virtualizing to intelligently distribute a resource that is owned by a social media cloud service system at a distribution system.

Analyzing and learning a user's action according to a user's request of a service and access type at a user agent comprises analyzing a connection, an inspection and an access device of a user at the user agent, setting a context for analyzing a user's status until a service resource is allocated to the user from a cloud service system at the user agent, setting an accessibility to a social media service via the context and deciding a service at the agent manager.

Deciding a resource of a cloud service system according to an analyzed user type according to a service and providing a virtualized module at a distribution agent comprises checking a user's context information transmitted from the user agent and a status of a resource to distribute according to a service decision information and classifying a service resource for a user to use by combining a user's context information with a checked context information of a system collecting and constructing a service including setting a new priority by sending a service priority when a resource focused on a specific user is requested, precluding a system fault happening at a service by acquiring a service resource that substitutes a service resource and modifying a service context information and allocating a social service resource suitable to a user according to an analysis information of the user status, the allocated resource is registered to a virtual register via a virtualization module and is freed at the end of user's connection, and continuously monitoring a status of a user's usage of virtualization module and providing the agent manager with the monitored information.

Managing a definition of a virtualization module of a service resource distributed by the distribution agent and a system status at a virtualization register comprises computing a usage rate of a resource by comparing a user's status with the distributed resource via the distribution manager and computing a service efficiency by comparing with a previous information from a virtualization service history, constructing a virtualization module by estimating at the time of redistribution of service resources to a corresponding user through the calculated information on usage rate of a resource and by collecting a service resource; and constructing a resource context through a constructed virtualization module and analyzing a service level with material for learning a status of usage of a service resource corresponding to each user at the system resource manager.

Managing multi agents constructed for virtualization of a social media service resource at an agent manager comprises a step that includes registering and activating by inspecting actions of the generated user agent, the distribution agent or the collecting agent at the agent manager, a step that includes providing a learning module learning a user's action and a system status and a step that includes writing an information about a deletions of the learning status and managing a profile of a user profile, wherein a rule of learning according to the learning module applies an information written to a user profile using a neural network to a learning module of the user agent, the distribution agent or the collecting agent.

Monitoring and managing physical and logical resources of a social media cloud system at a system resource manager comprises analyzing usage rate of a system by checking a resource status of a virtualized social media cloud system from the virtual register through the system resource manager, estimating a virtualization status that can be provided to a newly connected user by monitoring a remaining system resource and the monitored information, providing the system manger with the monitored information by acquiring a maximum usage rate of a social media cloud system that can be applied to each virtualization module of a resource in consideration of a system stability, constructing a system context which is a status information that a system keeps by analyzing a usage rate of the acquired social media cloud system, reconstructing a service resource for each slave of the system according to levels, setting a management priority according to a system by classifying a system resource according to a requirement status of system resource; and storing a system management information including the management priority according to a system.

Handling a user's request of a service, a virtualization of a service resource and a provision of a service comprises classifying a service request signal as a normal PC signal or a smart phone signal; and when the service request signal is classified as a smart phone signal constructing a service context including, constructing and checking a service context information constructed by the user agent, the distribution agent or the collection agent, providing a virtualization module with maximized service resource and servicing by acquiring maximum resources being available to the smart phone among resources of the social media cloud system and by constructing with the virtualization module.

Handling a user's request of a service, a virtualization of a service resource and a provision of a service comprises classifying a service request signal as a normal PC signal or a smart phone signal; and when the service request signal is classified as a PC signal constructing a service context including constructing and checking a service context information constructed by the user agent, the distribution agent or the collection agent a virtualization module with minimized service resource; and servicing by acquiring minimum resources being available to the PC among resource of the social media cloud system and by constructing with the virtualization module.

Virtualizing to intelligently distribute a resource that is owned by a social media cloud service system at a distribution system comprises analyzing a service request, computing a relative relation of service resources registered at register module among users of social cloud media service with a result of the analysis as an input and with requests from users as a function that determines a request priority according to service levels, distributing a service resource that includes acting as a concealed level after computing the relative relation of service resources, acquiring available resources from system at the user's request of a service resource and acquiring a system resource according to a priority, analyzing a situation that a request of a service is duplicated during distribution of service resources and constructing a virtualization module according to a priority of a service, constructing a service resource that includes generating a virtualization module by finally integrating a constructed service resource and providing a user with the virtualization module and integrating final result that ensures credibility of the final result by applying rule majority integration method for abstract levels after constructing a service resource.

Since the present invention provides a service environment that is adapted to a user status in the social media cloud computing environment that provides services to various terminals, the present invention has an advantage to cost just additional system fees arising from intelligently distributing service resources per user.

BRIEF DESCRIPTION OF THE DRAWINGS

Aspects of the present invention are best understood from the following detailed description when read with the accompanying figures.

DETAILED DESCRIPTION

It is understood that the following invention provides many different embodiments, or examples, for implementing different features of the invention. These are, of course, merely examples and are not intended to be limiting.

An intelligence virtualization system to support a social media cloud service according to the present invention is developed with a virtual service system model that can easily construct a cloud computing environment instead of a server-client system previously used to provide social media service and comprises an intelligence virtualization service handling method to provide automatic service resource according to types of using services.

Figure 1:
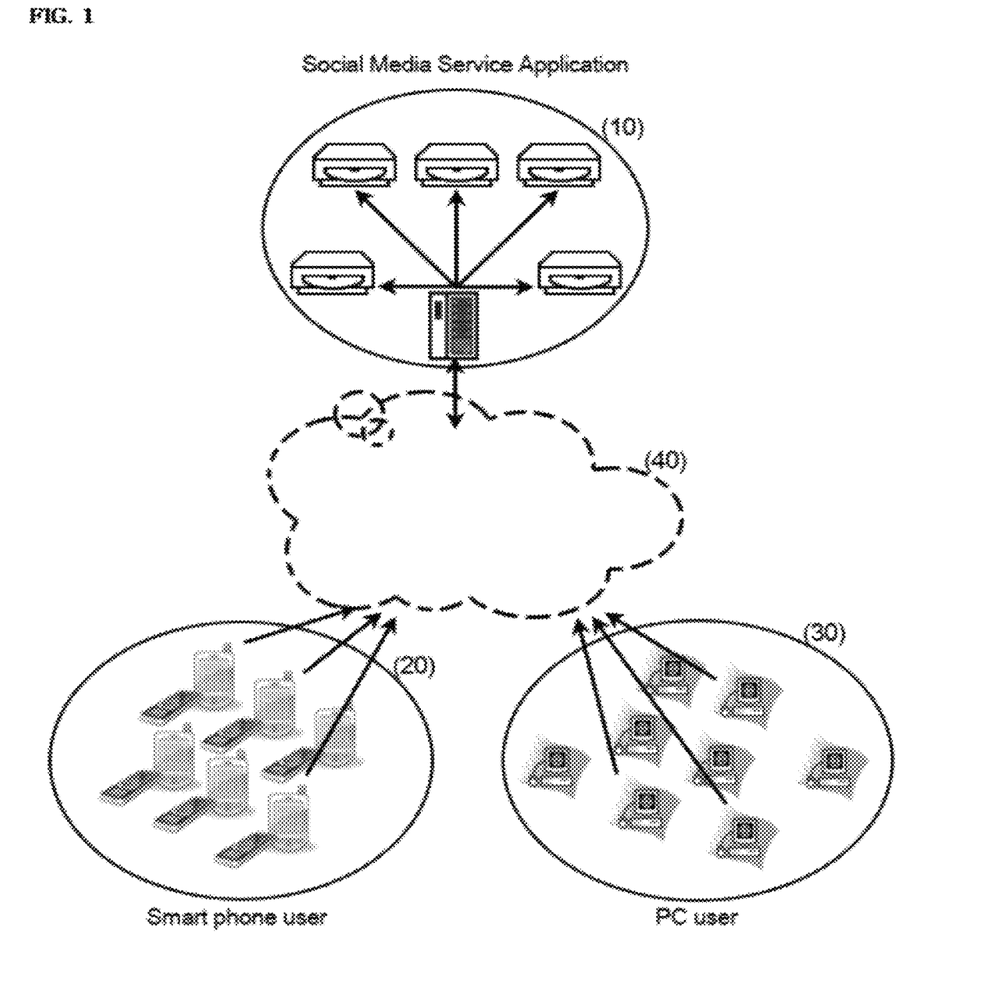
FIG. 1 is a block diagram illustrating a system about a social media cloud service according to an embodiment of the present invention.

As illustrated in FIG. 1, an intelligence virtualization system (or social media cloud service system or operating system thereof) to support a social media cloud service according to the present invention is a computing environment that is provide with one or more social media service resources from other service environments and provides service using virtualization method that intelligently distributes social service resource of cloud computing service having services according to users' devices.

As illustrated in FIG. 1, users' type can be classified as a smart phone user group 20 or a PC user group 30. Each user group requests resources to a social media cloud system 10 according to a network environment that each device can access.

Figure 2:
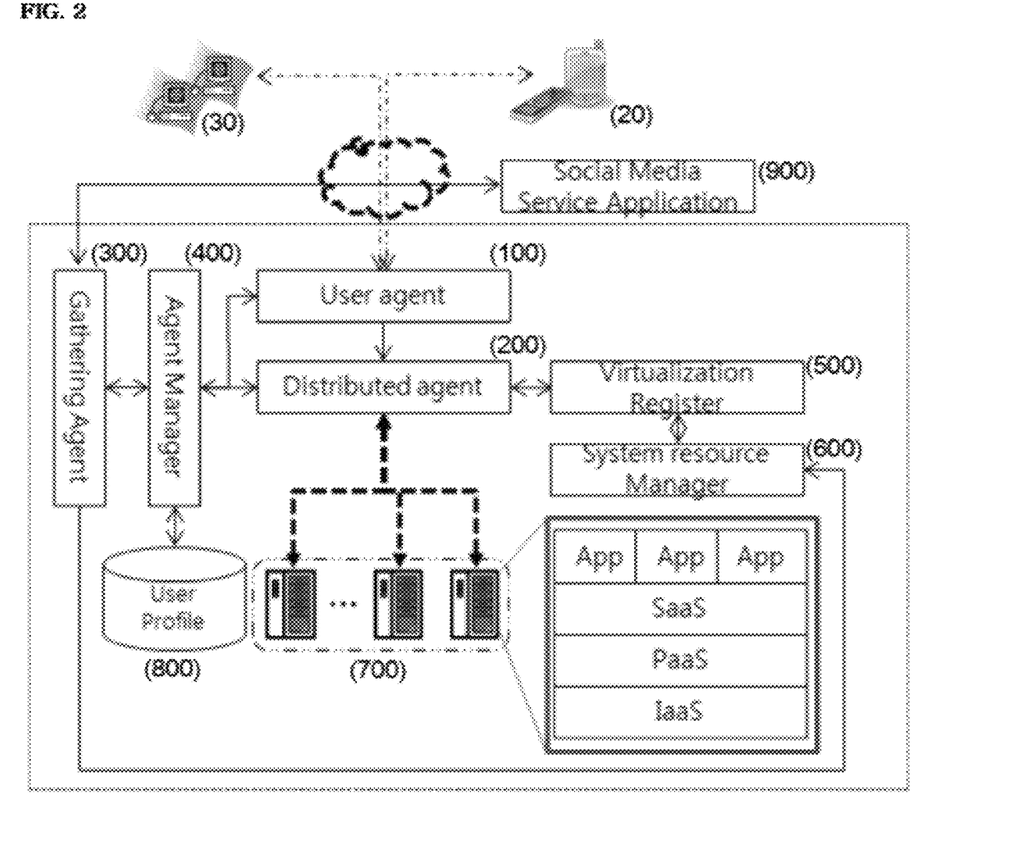
FIG. 2 is a block diagram illustrating a social media cloud service system of FIG. 1.

As illustrated in FIG. 2, an intelligence virtualization system to support social media cloud service comprises a user agent 100 analyzing and learning a user's action according to a user's service request and access type, a distribution agent 200 analyzing a service resource according to the user agent's request and distributing the service resource according to a user's request and access, an agent manager 400 monitoring learning and action status of multi agents comprised in social cloud system via the distribution agent, a gathering agent 300 collecting a service resource via the agent manager 400 and a social media service system and managing separately according to the service resource, a virtualization register 500 monitoring and managing a social media service resource virtualized via the distribution agent 200 from generation to extinction thereof, a system resource manager 600 providing a manager with monitored information of a user of a social media cloud system, a logical virtualization resource, an operation status of virtualization system via the gathering agent 300, a virtualization module 700 comprising resources including an infrastructure resource, a platform resource, a service resource and an application program of a cloud system for the distribution agent 200 to have distributed according to a user's service status; and a profile part 800 being used as learning material transmitted from the virtualization register 500 and being time of usage, rate of usage and contents of a social media service resource that is constructed by the virtualization through the agent manager 400.

An intelligence virtualization method to support a social media cloud service according to the present invention is briefly disclosed and the detail description follows with attached drawings.

An intelligence virtualization method to support a social media cloud service according to the present invention includes the following sub methods to intelligently distribute service resources to users according to amount of usage in the social media cloud computing environment: (1) a method to construct multi agents that intelligently distributes service resources that are suitable to a requesting user according to a type of access corresponding to a user's device in the cloud system providing a social media service and that manages service resources. (2) a method to handle service requests that handle services according to an environment that a user uses services in the social media cloud computing environment. (3) a method to distribute service resources that service resources are automatically distributed by the multi agents. The method to construct multi agents classifies social media cloud service resources according to a user's access type and intelligently distributes cloud computing service resources for the service resource that a user requested.

Moreover, the method to construct multi agents is a handling method at the user agent that defines a user's access type, constructs user's context information according to user's request information and an environment for using services, and thereby learns user's actions.

Further, the method to construct multi agents is a handling method at the social media information gathering agent that searches and upgrades additional service resources to continuously provide social media service resources to users and is a handling method at the agent manager that generation, registration and deletion (extinction) of each agent is managed and that each agent learns and monitors social media service resources of new users or previous users according to usage type.

Further, the method to construct multi agents is a method that automatically distributes services resources in the social media cloud computing environment including a virtualization register that registers and monitors a definition of a social media service resource distributed by the distribution agent and service usage rate, that automatically distributes services resources in the social media cloud computing environment including a profile part that monitors and registers actions of multi agent and uses it as a material to learn usage types of new users or previous users, that automatically distributes services resources in the social media cloud computing environment including a system resource manager that directly manages social media service and hardware resource and directly or indirectly manages system resources by monitoring virtualization register.

The method to handle service requests is a method that that automatically distributes service resources in the social media cloud computing environment including analyzing services that analyzes an access signal of a user that requests services and determines a resource distribution according to a user's status and a user's on-demand analysis by using a user information that includes constructing a user context by classifying users according to the access type.

Constructing a user context is a method that automatically distributes service resources in the social media cloud computing environment including a method that defines a user's device by analyzing a user's access signal and a method that defines a service and a service using environment to transform a size and a type of service according to a device.

Analyzing services is a method that automatically distributes service resources in the social media cloud computing environment including a distribution method that construct service resources as a minimum according to a device using a social media service and a distribution method that construct service resources as a maximum according to a device using a social media service.

The process to intelligently analyze service resources in the service resource distribution method is a method that automatically distributes service resources in the social media cloud computing environment including analyzing service request status information of a user, distributing a resource and constructing connection between service request information and distributed resources.

An intelligence virtualization method to support social media cloud service of the present invention comprises analyzing and learning a user's action according to a user's service request and access type at a user agent, deciding a resource of a cloud service system according to an analyzed user type according to a service and providing a virtualized module at a distribution agent, managing a definition of a virtualization module of a service resource distributed by the distribution agent and a system status at a virtualization register, managing multi agents constructed for virtualization of a social media service resource at an agent manager, monitoring and managing physical and logical resources of a social media cloud system at a system resource manager, handling user's request of a service, a virtualization of a service resource and a provision of a service, and virtualizing to intelligently distribute a resource that is owned by a social media cloud service system at a distribution system.

Figure 3:
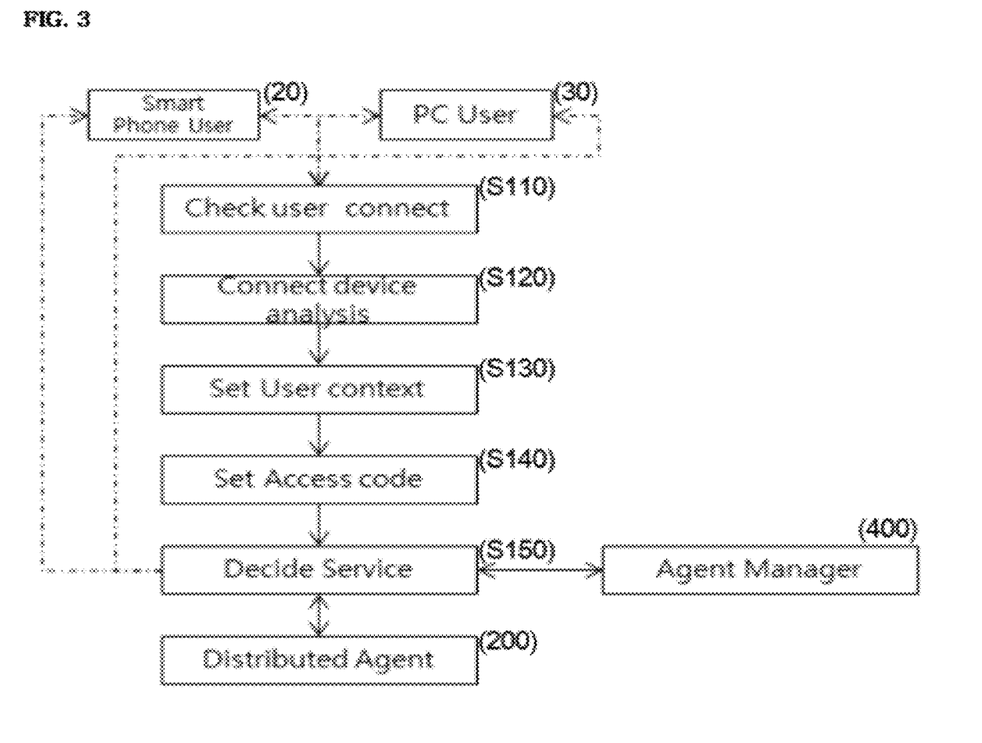
FIG. 3 is a flow chart illustrating a user agent of FIG. 2 that analyses a user's action.

In conjunction with drawings, an intelligence virtualization method to support social media cloud service according to an embodiment is described. As illustrated in FIG. 3, analyzing a user's status via a user agent from a user's access to an allocation of a service resource comprises inspecting a user's access and analyzing a accessing device S110, S120, setting a context that analyzes a user's status until it is allocated with a service resources from a cloud service system via the user agent S130, setting a accessibility to a social media service through the user context information S140 and determining a service at the user agent S150.

In other words, the user agent functions to analyze a user's status from a user's access to an allocation of service resources from a cloud service system.

Especially, setting a context to analyze a user's status is within an important service range that can determine the composition of service resources.

That is, since the kind of service to be provided is determined according to a device that a user accessed with and environment around a user, the user context information is important. The user context information can be used to give authority to access a social media service.

Figure 4:
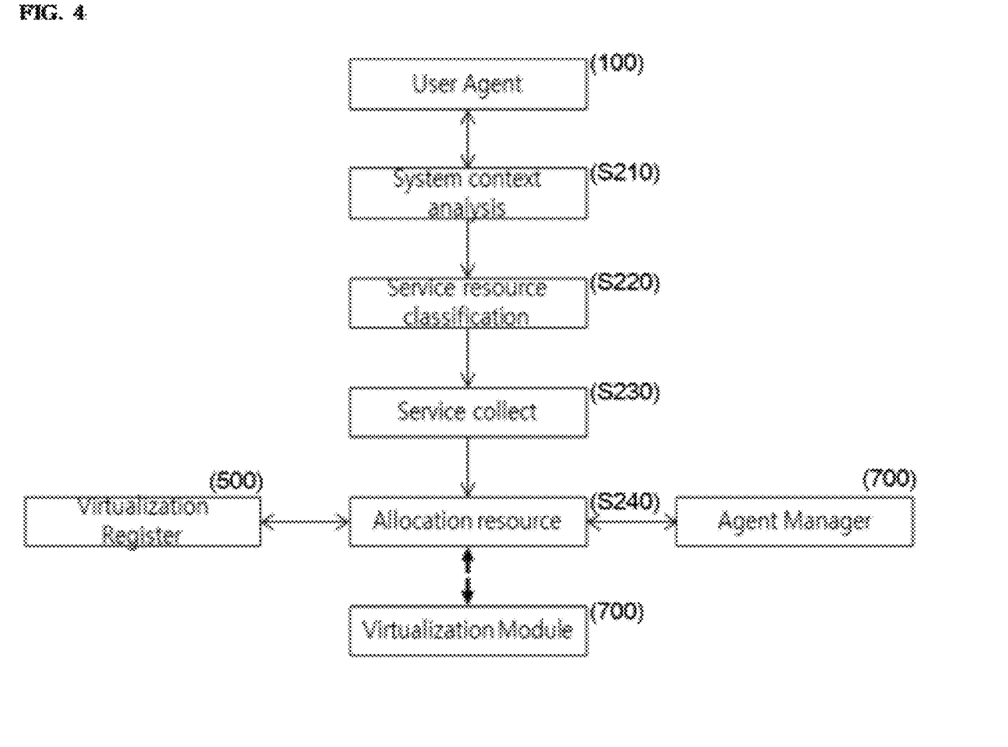
FIG. 4 is a flow chart illustrating a distribution agent of FIG. 2 that intelligently distributes service resources.

As illustrated in FIG. 4, deciding a resource of a cloud service system according to an analyzed user type according to a service and providing a virtualized module at a distribution agent comprises a step that includes classifying service resources for a user to use by checking a user context information transmitted from the user agent and a status of resources to distribute according to a service decision information and by combining a user context information with the checked system context information S220, a step that includes collecting and constructing services that includes setting a new priority by sending a service priority to operating system when a resource focused to a specific user is requested, a step that includes precluding a system fault during services by acquiring service resources that substitutes service resources and modifying system context information S230, and a step that includes allocating a social service resource suitable to a user by using information that analyzes a user's status, the allocated information is registered at the virtualization register via virtualization module and is freed at the end of user's connection, and monitoring the status of user's usage of virtualization module and providing the same with the agent manager S240.

Figure 5:
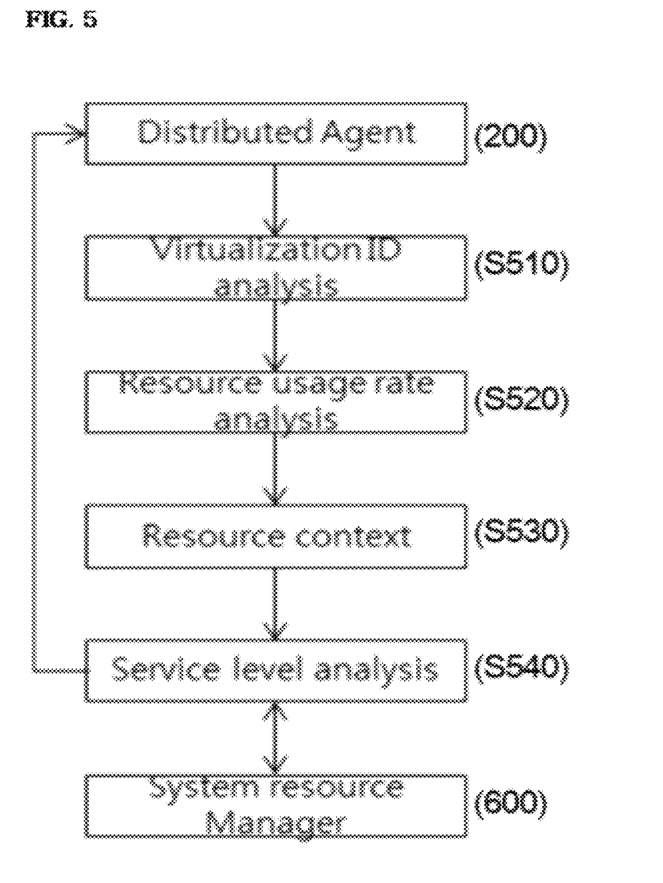
FIG. 5 is a flow chart illustrating a virtualization register of FIG. 2 that virtualizes service resources.

As illustrated in FIG. 5, managing a definition of a virtualization module of a service resource distributed by the distribution agent and a system status at a virtualization register comprises a step that includes analyzing virtualized ID and resource usage rate that includes calculating resource usage rate by comparing user's status with distributed resources at the distribution agent and calculating service efficiency by comparing with previous information from virtualized service history S510, S520 and a step that includes constructing a virtualization module by expecting and by collecting service resources at the time of redistribution of user's service resources by using the calculated resource usage rate information, and a step that includes analyzing a service level through a system resource manager with material for learning usage of service resources for each user by constructing a resource context through the constructed virtualization module S530, S540.

Figure 6:
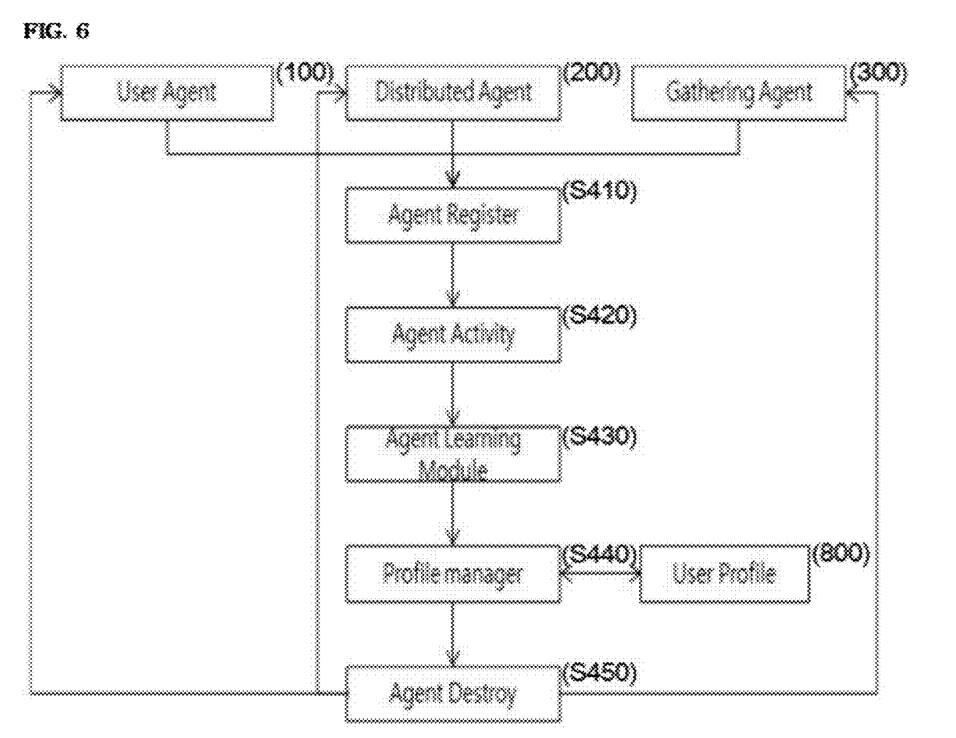
FIG. 6 is a flow chart illustrating an agent manager of FIG. 2 that directly generates and manages multi agents.

As illustrated in FIG. 6, managing multi agents constructed for virtualization of a social media service resource at an agent manager comprises a step that includes registering and activating by inspecting actions of the user agent, distribution agent and collecting agent at the agent manager S410, S420, a step that includes providing a learning module to learn users' actions and status of a system S430 and a step that includes registering information on the deletion of learning status and managing profile of users' profiles S440, S450 and the rule of learning according to the learning module applies the information registered at the user profile to the user agent, distribution agent or collecting agent via neural network.

Figure 7:
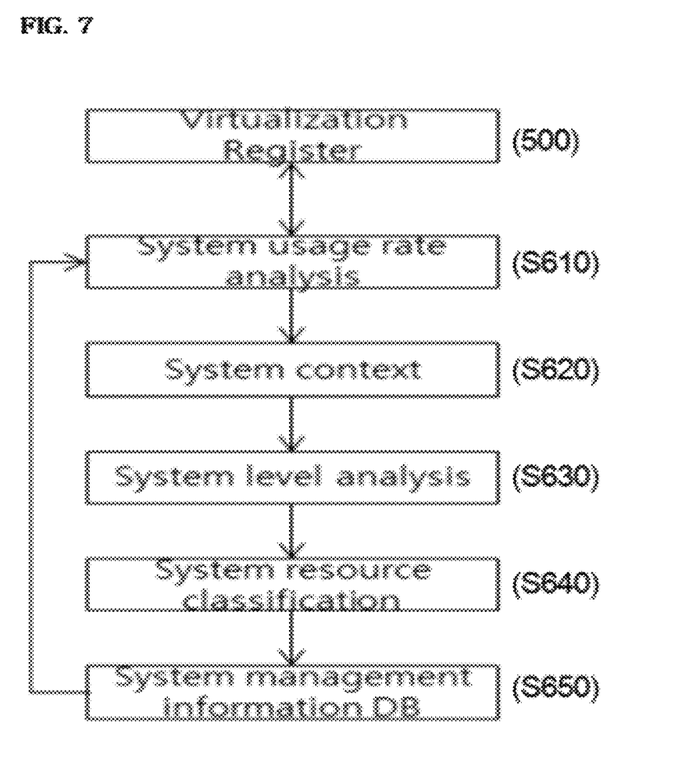
FIG. 7 is a flow chart illustrating a system resource manger of FIG. 2 that manages resources of the cloud system.

As illustrated in FIG. 7, monitoring and managing physical and logical resources of a social media cloud system at a system resource manager comprises a step that includes checking a status of resources of a virtualized social media cloud system from the virtualization register via system resource manager, a step that includes estimating a virtualization status to be provided for a newly accessed user and providing a system manager with the monitored information by acquiring the maximum usage rate of the social media cloud system that can be applied to a virtualization module of each resource by considering stability of a system, a step that includes constructing a system context which is an information that a system maintains by analyzing a acquired usage rate of the social media cloud system S620, a step that includes reconstructing service resources for each slave of a system according to levels S630, a step that includes setting a managing priority according to a request status of system resources and a step that includes storing a system management information that includes the managing priority per a system S650.

Figure 8:
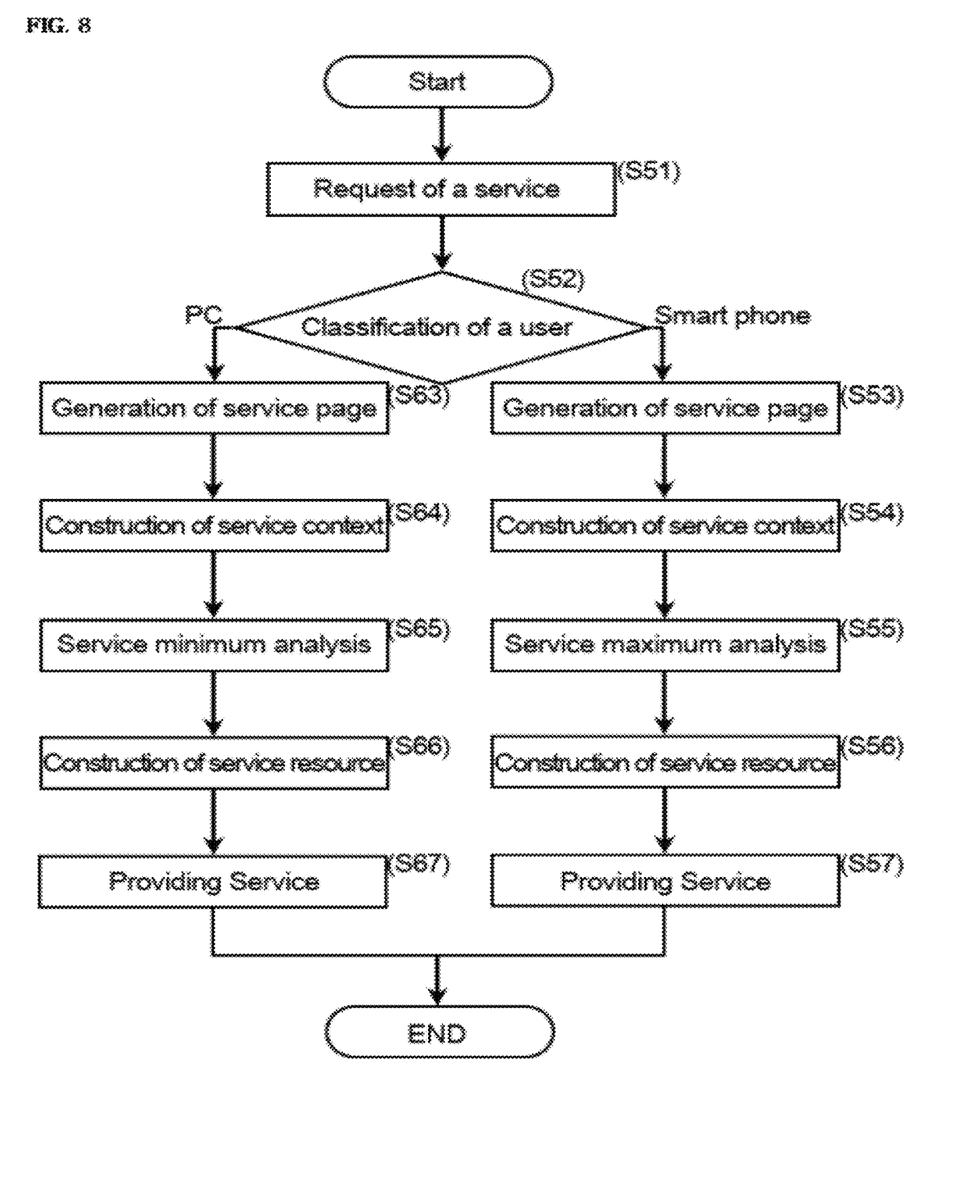
FIG. 8 is a flow chart illustrating a service handling process according to a service request.

As illustrated in FIG. 8, handling a user's request of a service, a virtualization of a service resource and a provision of a service comprises a step classifying a service request signal as a normal PC signal or a smart phone signal S52. When the signal is classified as a smart phone signal, the handling comprises a step that includes checking and constructing the service context information that the user agent, distribution agent or collecting agent constructed and providing a virtualization module with a maximized service resource S53, S54 and a step that includes providing a service by acquiring maximum resources that are available to the smart phone among the resources of a social media cloud system and by constructing the virtualization module with the same S55, S56, S57.

When the signal is classified as a normal PC signal, the handling comprises a step that that includes checking and constructing the service context information that the user agent, distribution agent or collecting agent constructed and providing a virtualization module with a minimized service resource S63, S64 and a step that includes providing a service by acquiring minimum resources that are available to the PC among the resources of a social media cloud system and by constructing the virtualization module with the same S65, S66, S67.

Since a user's request signal differs according to a user's device the service request signal is classified according to devices such as a PC or a smart phone.

The strategy to generate a social media service resource with the normal PC has so high capability to handle available resources that the strategy checks service context information constructed at the agents and provides minimized service resources to a virtualization module.

Thus it is possible to use a service without acquiring a virtualization resource by using an application resource that a normal PC has.

But a smart phone does not have enough applications and service resource to execute a social media service. Accordingly, maximum resources available to the smart phone among the resources of social media cloud system are acquired and are constructed as a virtualization module for service.

Figure 9:
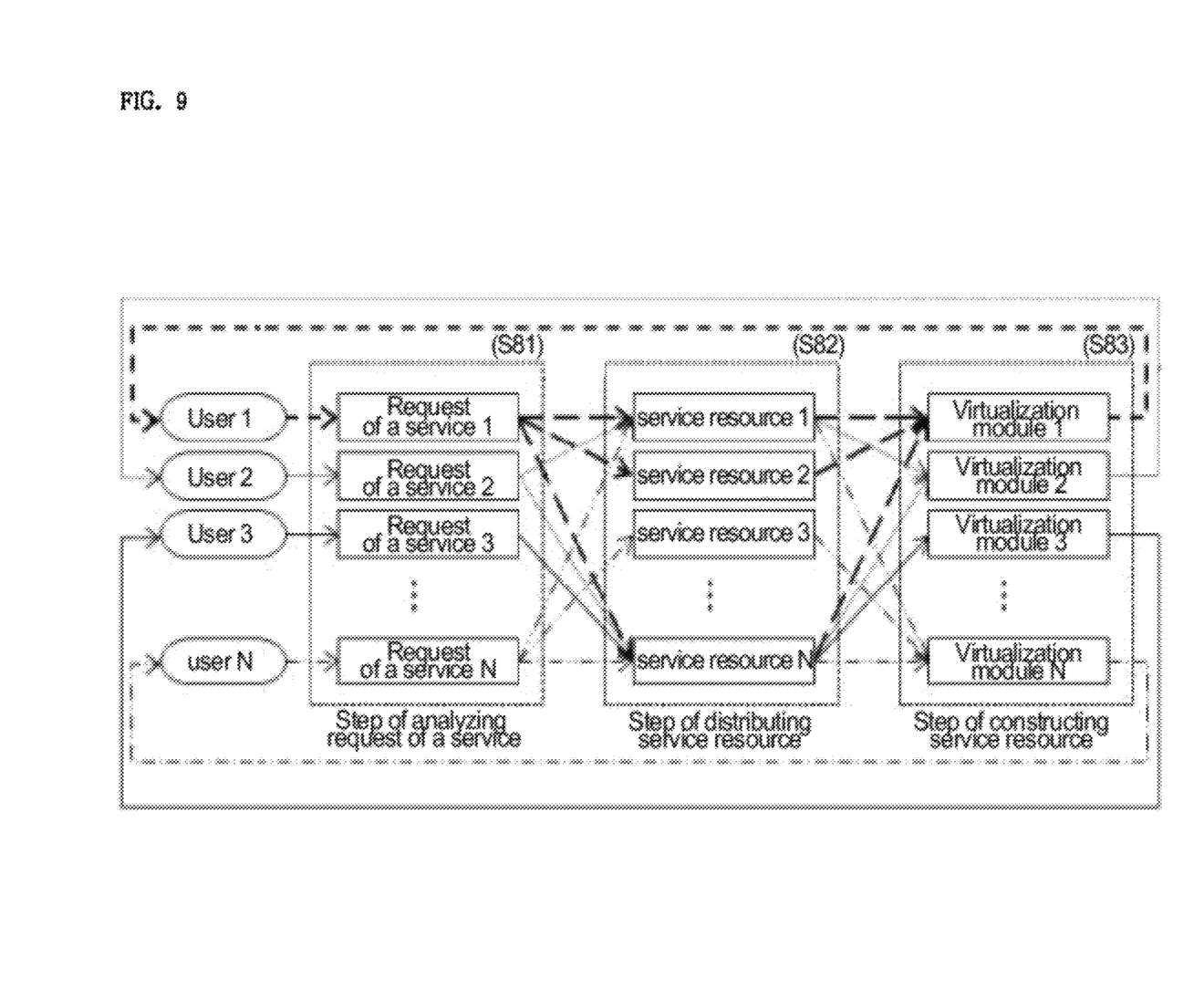
FIG. 9 is a flow chart illustrating a process for an intelligent virtualization.

As illustrated in FIG. 9, virtualizing to intelligently distribute a resource that is owned by a social media cloud service system at a distribution system comprises a step that includes analyzing a service request S81, a step that includes computing a relative relation of a service resource that is registered to a virtualization module among users of social media cloud service with the result of the analysis as an input and with the request signal of each user as a function that determines request priorities according to service levels, a step that includes mimicking the role of a concealed level, the distribution agent acquiring an available resource from a system according to a user's request of a service resource and acquiring system resources according to a priority S82, a step that includes generating a virtualization module by finally integrating constructed service resources and providing the virtualization module for a user S83 and a step that includes integrating final result that ensures credibility of the final result by applying rule majority integration method for abstract levels after constructing a service resource.

The virtualization handling process may preferably be comprised having steps for the distribution agent to execute by applying models and rules of neural network.

In the present invention, the social media service can be applied to various social network service industries such as a social marketing industry or a social game industry.

Moreover, the present invention can be used to construct a cloud computing system for media services that extends a server-client system.

The foregoing has outlined features of several embodiments so that those skilled in the art may better understand the detailed description that follows. Those skilled in the art should appreciate that they may readily use the present invention as a basis for designing or modifying other processes and structures for carrying out the same purposes and/or achieving the same advantages of the embodiments introduced herein. Those skilled in the art should also realize that such equivalent constructions do not depart from the spirit and scope of the present invention, and that they may make various changes, substitutions and alterations herein without departing from the spirit and scope of the present invention.

What is claimed is:

1. An intelligence virtualization method to support social media cloud service comprising:
   analyzing and learning a user's action by a computer system according to a user's request of a service and an access type at a user agent;
   deciding a resource of a cloud service system according to an analyzed user type according to a service and providing a virtualized module at a distribution agent;
   managing a definition of a virtualization module of a service resource distributed by the distribution agent and a system status at a virtualization register;
   managing multi agents constructed for virtualization of a social media service resource at an agent manager;
   monitoring and managing physical and logical resources of a social media cloud system at a system resource manager;
   handling the user's request of the service, a virtualization of a service resource, and a provision of the service; and
   virtualizing to intelligently distribute a resource that is owned by a social media cloud service system at a distribution system,
   wherein handling the user's request of the service, the virtualization of the service resource, and the provision of the service comprises:
   classifying a service request signal as a normal personal computer (PC) signal or a smart phone signal;
   when the service request signal is classified as the smart phone signal constructing a service context including:
   constructing and checking service context information constructed by the user agent, the distribution agent, or a collection agent;
   providing the virtualization module with a maximized service resource; and
   servicing by acquiring maximum resources being available to a smart phone among resources of the social media cloud system and by constructing with the virtualization module; and
   when the service request signal is classified as the PC signal constructing a service context including:
   constructing and checking service context information constructed by the user agent, the distribution agent, or the collection agent;
   providing the virtualization module with a minimized service resource; and
   servicing by acquiring minimum resources being available to a PC among the resources of the social media cloud system and by constructing with the virtualization module.

2. The intelligence virtualization method of claim 1, wherein analyzing and learning a user's action according to a user's request of a service and access type at a user agent comprises:
   analyzing a connection, an inspection and an access device of a user at the user agent;
   setting a context for analyzing a user's status until a service resource is allocated to the user from a cloud service system at the user agent;
   setting an accessibility to a social media service via the context; and
   deciding a service at the agent manager.

3. The intelligence virtualization of claim 1, wherein deciding a resource of a cloud service system according to an analyzed user type according to a service and providing a virtualized module at a distribution agent comprises:
- checking a user's context information transmitted from the user agent and a status of a resource to distribute according to a service decision information and classifying a service resource for a user to use by combining a user's context information with a checked context information of a system;
- collecting and constructing a service including: setting a new priority by sending a service priority when a resource focused on a specific user is requested;
- precluding a system fault happening at a service by acquiring a service resource that substitutes a service resource; and modifying a service context information; and
- allocating a social service resource suitable to a user according to an analysis information of the user status, the allocated resource is registered to a virtual register via a virtualization module and is freed at the end of user's connection, and continuously monitoring a status of a user's usage of virtualization module and providing the agent manager with the monitored information.

4. The intelligence virtualization of claim 2, wherein deciding a resource of a cloud service system according to an analyzed user type according to a service and providing a virtualized module at a distribution agent comprises:
- checking a user's context information transmitted from the user agent and a status of a resource to distribute according to a service decision information and classifying a service resource for a user to use by combining a user's context information with a checked context information of a system;
- collecting and constructing a service including: setting a new priority by sending a service priority when a resource focused on a specific user is requested;
- precluding a system fault happening at a service by acquiring a service resource that substitutes a service resource; and modifying a service context information; and
- allocating a social service resource suitable to a user according to an analysis information of the user status, the allocated resource is registered to a virtual register via a virtualization module and is freed at the end of user's connection, and continuously monitoring a status of a user's usage of virtualization module and providing the agent manager with the monitored information.

5. The intelligence virtualization of claim 1, wherein managing a definition of a virtualization module of a service resource distributed by the distribution agent and a system status at a virtualization register comprises:
- computing a usage rate of a resource by comparing a user's status with the distributed resource via the distribution manager and computing a service efficiency by comparing with a previous information from a virtualization service history;
- constructing a virtualization module by estimating at the time of redistribution of service resources to a corresponding user through the calculated information on usage rate of a resource and by collecting a service resource; and
- constructing a resource context through a constructed virtualization module and analyzing a service level with material for learning a status of usage of a service resource corresponding to each user at the system resource manager.

6. The intelligence virtualization of claim 1, wherein managing multi agents constructed for virtualization of a social media service resource at an agent manager comprises:
- registering and activating by inspecting actions of the generated user agent, the distribution agent or the collecting agent at the agent manager;
- providing a learning module for learning a user's action and status of a system; and
- writing information on a deletion of the learning status and managing a profile of a user profile, wherein a rule of learning according to the learning module applies an information written to a user profile using a neural network to a learning module of the user agent, the distribution agent or the collecting agent.

7. The intelligence virtualization of claim 1, wherein monitoring and managing physical and logical resources of a social media cloud system at a system resource manager comprises:
- analyzing usage rate of a system by checking a resource status of a virtualized social media cloud system from the virtual register through the system resource manager;
- estimating a virtualization status of the social media cloud system that can be provided to a newly connected user by monitoring a remaining system resource, and providing the system manger with the monitored information by acquiring a maximum usage rate of a social media cloud system that can be applied to each virtualization module of a resource in consideration of a system stability;
- constructing a system context which is a status information that a system keeps by analyzing a usage rate of the acquired social media cloud system;
- reconstructing a service resource for each slave of the system according to service levels;
- setting a management priority according to the system by classifying a system resource according to a requirement status of system resource; and
- storing a system management information including the management priority according to the system.

8. The intelligence virtualization of claim 1, wherein virtualizing to intelligently distribute a resource that is owned by a social media cloud service system at a distribution system comprises:
- analyzing a service request; computing a relative relation of service resources registered at register module among users of social cloud media service with a result of the analysis as an input and with requests from users as a function that determines a request priority according to service levels;
- distributing a service resource that includes acting as a concealed level after computing the relative relation of service resources, acquiring available resources from system at the user's request of a service resource and acquiring a system resource according to a priority;
- analyzing a situation that a request of a service is duplicated during distribution of service resources and constructing a virtualization module according to a priority of a service;
- constructing a service resource that includes generating a virtualization module by finally integrating a constructed service resource and providing a user with the virtualization module; and
- integrating final result that ensures credibility of the final result by applying rule majority integration method for abstract levels after constructing a service resource.

* * * * *